United States Patent [19]

Borntrager

[11] Patent Number: 4,899,431

[45] Date of Patent: Feb. 13, 1990

[54] ANCHOR SETTING TOOL

[76] Inventor: Harvey S. Borntrager, 412 High St., P.O. Box 124, Weyauwega, Wis. 54983

[21] Appl. No.: 206,176

[22] Filed: Jun. 13, 1988

[51] Int. Cl.$^4$ .............................................. B23P 19/06
[52] U.S. Cl. ...................................... 29/244; 411/53; 411/55
[58] Field of Search ...................... 29/522.1, 523, 244; 411/44, 49, 50, 51, 52, 53, 54, 55, 57, 60, 8, 9, 10, 11, 12, 13, 14

[56] References Cited

U.S. PATENT DOCUMENTS

| | | | |
|---|---|---|---|
| 996,515 | 8/1910 | Baker | 411/53 |
| 1,101,302 | 6/1914 | Masor | 411/53 |
| 1,560,095 | 11/1925 | Peirce . | |
| 2,647,431 | 8/1953 | Lewis | 411/53 |
| 2,661,649 | 12/1953 | Skinner | 411/53 |
| 2,994,242 | 8/1961 | Buff et al. | 411/55 |
| 3,139,730 | 7/1964 | Williams et al. . | |
| 3,192,822 | 7/1965 | Genter . | |
| 3,236,144 | 2/1966 | Taylor | 411/53 |
| 4,339,217 | 7/1982 | Lacey | 411/55 |
| 4,342,527 | 8/1982 | White | 411/60 X |
| 4,548,533 | 10/1985 | Pratt . | |
| 4,572,023 | 2/1986 | Euler | 411/55 X |
| 4,592,687 | 6/1986 | Piersall . | |
| 4,636,122 | 1/1987 | Rooney . | |
| 4,656,806 | 4/1987 | Leibhard . | |

OTHER PUBLICATIONS

Soled, Fasteners Handbook, pp. 371, 372 and 376, 1957, U.S.A.

Primary Examiner—Timothy V. Eley
Assistant Examiner—Peter D. B. Vo
Attorney, Agent, or Firm—Fuller, Puerner & Hohenfeldt

[57] ABSTRACT

A tool for setting threaded anchors, having an elongated body with a longitudinal bore and a threaded shaft received in the bore and projecting beyond both ends of the body to form a nut engaging end and an anchor engaging end. The anchors to be set include an anchor frustum having a longitudinal threaded bore, surrounded by a soft sleeve. A pinway is formed in the body communicating with the bore, and a retaining pin, in engagement with the threaded shaft, projects laterally through the pinway, for preventing relative rotational motion between the threaded shaft and the body while allowing relative longitudinal motion. A nut engages with the nut engaging end of the shaft. The method of setting such an anchor is to insert the anchor, attached to the end of the tool, into a hole where the anchor is to be set. The nut is then rotated with respect to the shaft, while preventing the rotation of the shaft and the body, so as to draw the frustum into the soft sleeve until the anchor is affixed within the hole. The body and shaft are then rotated in unison in the opposite direction to disengage the shaft from the anchor frustum.

12 Claims, 1 Drawing Sheet

ANCHOR SETTING TOOL

BACKGROUND OF THE INVENTION

This invention relates to tools for setting anchors, and in particular to such tools for setting threaded expanding anchors, which are set without exerting an impact on the anchor.

There are a number of anchors which are available which can be set without the necessity for an impact. These are very useful wherever an impact would be undesirable, such as where such an impact would be dangerous or could cause unsightly damage. An example of the former is disclosed in U.S. Pat. No. 3,139,730. That patent shows a rock anchor for use in roof stabilization in mines. Clearly, an improper impact when constructing a mine roof could be very dangerous. An example of the latter would be where it is desired to set such an anchor in drywall, or a concrete wall, or some other decorative structural substance. Damage to such a substance would be highly unsightly.

Generally, however, when setting these types of anchors, it is necessary to leave behind the screw or other threaded member used to expand the expanding member, as the threaded member often becomes an integral part of the anchor itself. This can defeat the purpose of the installation, if what is needed is an embedded nut which can repeatedly receive and release a screw. A need exists for a setting tool which is removable and reusable to set any number of such threaded anchors.

This invention relates to improvements to the apparatus set forth above and to solutions to the problems raised thereby.

SUMMARY OF THE INVENTION

The invention relates to a tool for setting threaded anchors. The anchors for which the tool is intended include an anchor frustum having a longitudinal threaded bore and surrounded by a soft sleeve. The tool which is the subject of the invention comprises an elongated body having a longitudinal bore and a threaded shaft received in the bore and projecting beyond both ends of the body to form a nut engaging end and an anchor engaging end. The tool is provided with means for preventing relative rotational motion between the threaded shaft and the body while allowing relative longitudinal motion. A nut is further provided for engaging with the nut engaging end of the shaft. The means for preventing relative rotational motion between the shaft and the body while allowing longitudinal motion includes a pinway formed in the body and connecting to the bore, and a retaining pin in engagement with the threaded shaft and projecting laterally through the pinway. In one embodiment, the body has marks placed along the pinway for indicating how much the anchor frustum has been drawn into the soft sleeve. The body has a polygonal cross section so as to aid in holding it from turning when turning the nut. The body is further provided with a relief at least at one end thereof for allowing recessed setting of the anchor.

The invention also includes a method for setting such an anchor. According to the method, the first step is to provide a tool as described above. Next, the anchor engaging end of the tool is inserted through the soft sleeve and engaged with the threaded bore of the anchor frustum, and the anchor is inserted into a hole provided in the anchor substrate for the purpose. Once the anchor is inserted into the hole, the nut is rotated with respect to the shaft, while preventing the rotation of the shaft and the body, in such a direction as to draw the frustum into the soft sleeve until the frustum is sufficiently drawn in as to force the soft sleeve outward and thus affix the anchor within the hole. The body and shaft are then rotated in unison in the opposite direction so as to disengage the shaft from the anchor frustum.

Other objects and advantages of the invention will become apparent hereinafter.

DESCRIPTION OF THE PREFERRED EMBODIMENT

Figure 1:
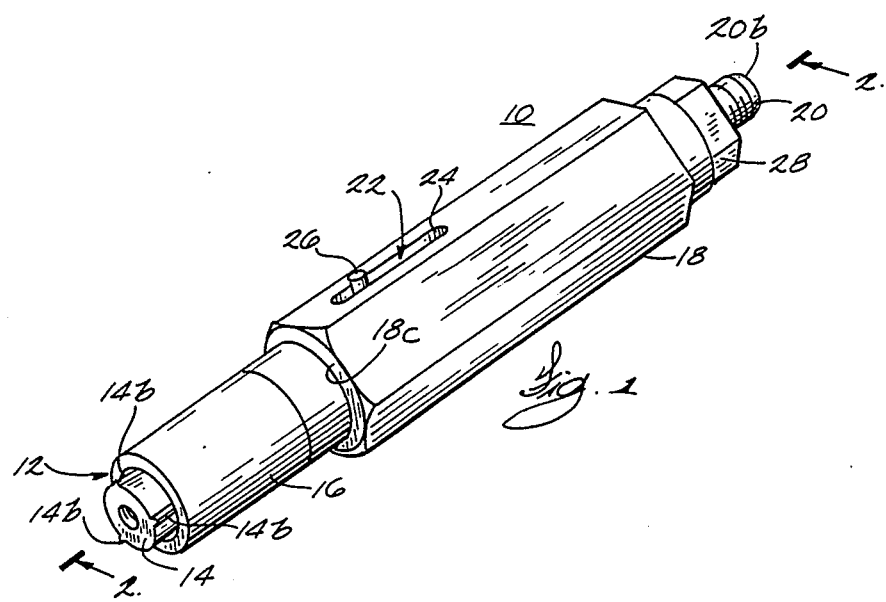
FIG. 1 is an isometric view of an anchor setting tool constructed according to a preferred embodiment of the invention, having an anchor engaged to one end thereof.
Figure 2:
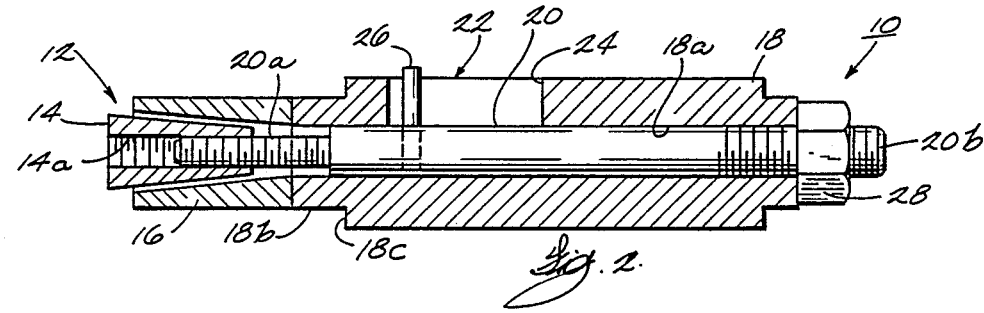
FIG. 2 is a cross-sectional view of the tool shown in FIG. 1, taken generally along line 2—2 thereof.

Referring now to Figs. 1 and 2, there is shown an anchor setting tool 10 constructed according to a preferred embodiment of the invention. The tool 10 is shown already attached to a threaded expandable anchor 12, which includes an anchor frustum 14, which has a longitudinal threaded bore 14a centered therein. Surrounding the frustum 14 is a sleeve member 16, which is formed of a material that is softer than the material of the frustum. For instance, generally the frustum 14 will be formed of steel, while the sleeve 16 will be made of lead. As shown best in FIG. 2, the inside diameter of the sleeve 16 may be tapered, similar to the outside diameter of the frustum 14. The largest inside diameter portion of the sleeve 16, however, must of course be sized between the smallest and the largest outside diameter portions of the frustum 14. This is the only strict relative size requirement as between the frustum 14 and the sleeve 16. Further, the frustum 14 includes lengthwise ridges 14b, shown best in FIG. 1, running the length of the outside surface thereof the frustum. The preferred embodiment shows three of these ridges 14b, evenly spaced about the frustum 14. The purpose of these ridges 14b is to prevent relative rotational motion between the frustum and the sleeve 16, while the anchor 12 is being installed. That is, as the frustum 14 is drawn into the sleeve 16, the ridges 14b dig into the relatively softer inside walls of the sleeve and prevent the frustum from turning or rotating with respect to the sleeve.

The tool 10, then, is used to install the anchors 12. As shown in FIGS. 1 and 2, the tool 10 includes a body 18 which has a longitudinal bore 18a formed therein, which bore opens at both ends of the body. A shaft 20 is slidably received in the bore 18a, and is of sufficient length to project out of both ends of the body 18 simultaneously. The shaft 20 is threaded at least at both ends. One such threaded end is termed an anchor engaging end 20a while the opposite end is termed a nut engaging end 20b.

The invention calls for means 22 for preventing relative rotational movement between the body 18 and the shaft 20, while allowing relative longitudinal sliding motion between them. While a grooved bore 18a may be employed in combination with ridges (not shown) on the shaft 20, or any other suitable means, in the preferred embodiment a pinway 24 is formed lengthwise in the body and communicating with the bore 18a. A pin 26 is securely engaged laterally to the shaft 20 and projects outward through pinway 24. Since the pinway 24 is formed lengthwise in the body 18 it allows pin 26, and hence shaft 20, to move lengthwise within the body, while at the same preventing the shaft from rotating with respect to the body. Finally, then, a nut 28 is threaded onto the nut engaging end 20b of the shaft 20.

Figure 3:
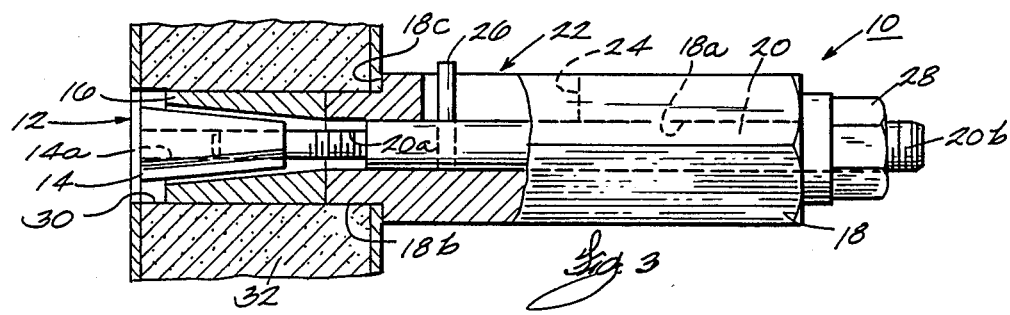
FIG. 3 is a side elevational view of the tool shown in FIG. 1, partially in section, showing the anchor inserted into the hole in the anchor substrate.
Figure 4:
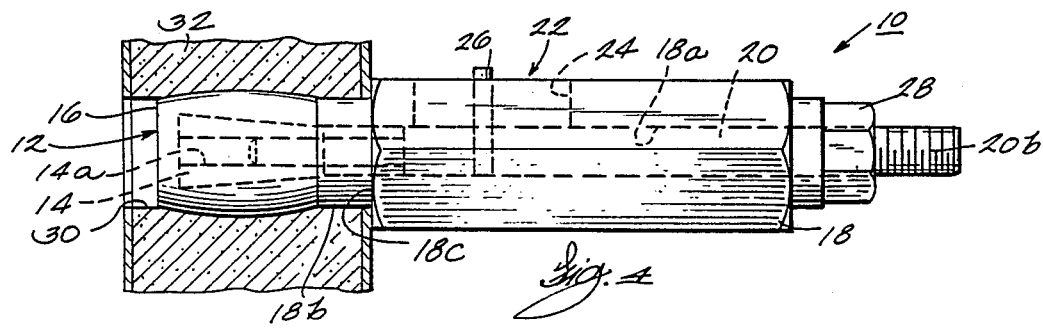
FIG. 4 is a side elevational view of the tool shown in FIG. 1, similar to FIG. 3, but with the tool having been used to seat the anchor in the hole.

FIGS. 3 and 4 show a method of use of the tool 10 according to the invention in installing an anchor 12 into a hole 30 formed in an anchor substrate 32. In use, the anchor 12 is first attached to the tool 10 by threading the anchor frustum 14 onto the anchor accepting end 20a of the shaft 20 until the sleeve 16 contacts the near end of the body 18. The anchor 12 is then inserted into the hole 30 until the body 18 prevents further insertion, that is, until the body bottoms against the anchor substrate 32. If the end of the body 18 to which the anchor 12 is attached is provided with a relief portion 18b the outside diameter of which does not exceed the outside diameter of the sleeve 16, the anchor may be set recessed within the anchor substrate 32 as shown in the figures. In that case the anchor 12 is inserted until the shoulder 18c portion of the body 18 beyond the relief portion 18b contacts the anchor substrate 32. Once the anchor 12 is inserted into the hole 30 to the desired position, the nut 28 is rotated while the body 18, and hence the shaft 20 because of the means 22, is prevented from rotating. While any suitable means may be employed to prevent rotation of the body 18, such as a pipe wrench (not shown), preventing the body from rotating is facilitated if the body is provided with a polygonal shape or cross section. As shown in the figures, the preferred polygonal cross section is that of a hexagon, to allow the use of a conventional wrench (not shown) to prevent the rotation of the body 18. Thus rotating the nut 28 in the proper direction while preventing the rotation of the body causes the shaft 20 to advance axially out of the body 18, to the right in FIGS. 3 and 4. This in turn causes the anchor frustum 12 to advance axially into the sleeve 16, expanding the sleeve. If the anchor substrate 32 is relatively soft, such as drywall, the sleeve 16 will expand into the substrate as shown in FIG. 4. Otherwise the sleeve 16 will expand against the inside walls of the substrate 32, holding the anchor frustum 14 fast. Once the frustum 14 is sufficiently fast within the sleeve 16 and within the anchor substrate 32, the body 18 and shaft 20 are rotated in the opposite direction to remove them from the frustum.

While the method and apparatus hereinbefore described is effectively adapted to fulfill the aforesaid objects, it is to be understood that the invention is not intended to be limited to the specific preferred embodiment of anchor setting tool and method of use set forth above. Rather, it is to be taken as including all reasonable equivalents within the scope of the following claims.

I claim:

1. A tool for setting threaded anchors comprising:
   a body having a polygonal cross-section and a longitudinal bore, and a pinway passing from outside said body to said bore, and reliefs formed at each end of said body;
   a threaded shaft received in said bore and retained therein by a retaining pin in engagement with said threaded shaft and projecting laterally through said pinway, said shaft projecting beyond both ends of said body to form a nut engaging end and an anchor engaging end; and
   a nut engaged with said nut engaging end of said shaft;
   whereby a threaded anchor, separate and distinct from said body and including an anchor frustum having a longitudinal threaded bore by which it is removably engaged with said anchor engaging end of said shaft, and a soft sleeve surrounding said frustum, is set by said tool;
   said tool being removable from said anchor and reusable after said anchor is set, leaving behind the set anchor.

2. An anchor setting tool as recited in claim 1 wherein said body has marks placed along said pinway for indicating a quantity of relative movement of said pin along said pinway.

3. A tool for setting threaded anchors, said anchors including an anchor frustum having a longitudinal threaded bore and surrounded by a soft sleeve, said tool comprising:
   a body, separate and distinct from said frustum and said sleeve of said anchor, said body having a longitudinal bore;
   a threaded shaft received in said bore and projecting beyond both ends of said body to form a nut engaging end and an anchor engaging end, for removably engaging with said anchor frustum;
   means for preventing relative rotational motion between said threaded shaft and said body while allowing relative longitudinal motion; and
   a nut for engaging with said nut engaging end of said shaft,
   said tool being removable from said anchor and reusable after said anchor is set, leaving behind the set anchor.

4. A tool as recited in claim 3 wherein said means for preventing relative rotational motion between said shaft and said body while allowing longitudinal motion includes a pinway formed in said body and connecting to said bore, and a retaining pin in engagement with said threaded shaft and projecting laterally through said pinway.

5. An anchor setting tool as recited in claim 4 wherein said body has marks placed along said pinway for indicating a quantity of relative movement of said pin along said pinway.

6. An anchor setting tool as recited in claim 3 wherein said body has a polygonal cross section so as to aid in holding it from turning when turning said nut.

7. An anchor setting tool as recited in claim 3 wherein said body has a relief at least at one end thereof for allowing recessed setting of said anchor.

8. A tool for setting threaded anchors comprising:
   a body having a polygonal cross-section and a longitudinal bore, and a pinway passing from outside said body to said bore;
   a threaded shaft received in said bore and retained therein by a retaining pin in engagement with said threaded shaft and projecting laterally through said pinway, said shaft projecting beyond both ends of said body to form a nut engaging end and an anchor engaging end; and a nut engaged with said nut engaging end of said shaft;

whereby a threaded anchor engaged with said anchor engaging end of said shaft is set;

said body having markings placed along said pinway for indicating quantities of accumulated relative movement of said pin along said pinway;

said tool being removable from said anchor and reusable after said anchor is set, leaving behind the set anchor.

9. An anchor setting tool as recited in claim 8 wherein said body has a relief at least at one end thereof for allowing recessed setting of said anchor.

10. A tool for setting threaded anchors, said anchors including an anchor frustum having a longitudinal threaded bore and surrounded by a soft sleeve, said tool comprising:

a body having a longitudinal bore;

a threaded shaft received in said bore and projecting beyond both ends of said body to form a nut engaging end and an anchor engaging end, for engaging with said anchor frustum;

means for preventing relative rotational motion between said threaded shaft and said body while allowing relative longitudinal motion, including a pinway formed in said body and connecting to said bore, and a retaining pin in engagement with said threaded shaft and projecting laterally through said pinway;

said body having markings placed along said pinway for indicating quantities of accumulated relative movement of said pin along said pinway; and a nut for engaging with said nut engaging end of said shaft;

said tool being removable from said anchor and reusable after said anchor is set, leaving behind the set anchor.

11. An anchor setting tool as recited in claim 10 wherein said body has a polygonal cross section so as to aid in holding it from turning when turning said nut.

12. An anchor setting tool as recited in claim 10 wherein said body has a relief at least at one end thereof for allowing recessed setting of said anchor.

* * * * *